United States Patent

Martensson et al.

[11] Patent Number: 6,063,294
[45] Date of Patent: May 16, 2000

[54] UNIFORM AREA SHOWER FOR DISC FILTER

[75] Inventors: Johan Martensson, Markham; Bal K. Seth, Mississauga; Donald Brown, Orilla, all of Canada

[73] Assignee: Baker Hughes Incorporated, Houston, Tex.

[21] Appl. No.: 09/241,675

[22] Filed: Feb. 2, 1999

Related U.S. Application Data

[63] Continuation-in-part of application No. 08/729,922, Oct. 15, 1996, abandoned, and a continuation-in-part of application No. 08/729,923, Oct. 15, 1996, and a continuation-in-part of application No. 08/991,684, Dec. 16, 1997, Pat. No. 5,968,372
[60] Provisional application No. 60/033,097, Dec. 16, 1996.

[51] Int. Cl.$^7$ .......................... B01D 37/04; B01D 33/15; B01D 33/50
[52] U.S. Cl. .................. 210/739; 210/741; 210/744; 210/772; 210/778; 210/780; 210/791; 210/797; 210/103; 210/104; 210/107; 210/331; 210/391; 210/396; 210/406; 210/408; 210/409
[58] Field of Search ...................... 210/739, 741, 210/744, 772, 777, 778, 780, 784, 97, 103, 104, 106, 107, 330, 331, 406, 402, 409, 391, 396, 407, 408, 791, 797

[56] References Cited

U.S. PATENT DOCUMENTS

| | | |
|---|---|---|
| 262,877 | 8/1882 | Wood . |
| 689,934 | 12/1901 | Vrooman et al. . |
| 735,080 | 8/1903 | Fletcher . |
| 736,669 | 8/1903 | Zoeller . |
| 935,629 | 10/1909 | Allbright et al. . |
| 951,183 | 3/1910 | Gaara . |
| 1,264,635 | 4/1918 | Graham . |
| 1,421,364 | 7/1922 | Allen . |
| 1,494,122 | 5/1924 | McCaskell . |
| 1,566,929 | 12/1925 | Thune . |
| 1,686,092 | 10/1928 | Manning . |

(List continued on next page.)

FOREIGN PATENT DOCUMENTS

| | | |
|---|---|---|
| 584228 | 2/1987 | Australia . |
| 2102344 | 5/1994 | Canada . |
| 0 044 652 | 1/1982 | European Pat. Off. . |
| 1 301 801 | 12/1962 | France . |
| 2-307503 | 12/1990 | Japan . |
| WO93/23140 | 11/1993 | WIPO . |

OTHER PUBLICATIONS

"Engineering Outline: Jet Pumps" prepared by members of the staff of BHRA Fluid Engineering, published in "Engineering" on May 3, 1968 as No. 123 Jet mixing design and applications—By P.R. Bathija Dec. 13, 1982—chemical Engineering Magazine pp 89–94.

*Primary Examiner*—Robert Popovics
*Attorney, Agent, or Firm*—Cantor Colburn LLP

[57] ABSTRACT

A uniform area shower for use with a disc filter. The disc filter includes at least one disc and moving showers that periodically remove a precoat layer of solids from the surface of the disc. In one embodiment the uniform area shower comprises a oscillating shower that is pivotly mounted and travels radially over the disc. In an alternative embodiment the uniform area shower comprises a traversing shower that mounts to a carriage and travels radially over the disc. Each shower includes a controller controlling the drive mechanism to vary the speed of transport of the shower across the surface of the disc such that time spent by the shower cleaning the disc at each radial cleaning position is generally proportional to the radial distance of the cleaning position from the center of the disc so that a wash liquid is applied to a uniform area of the interior and exterior of the disc. At the interior of the disc, where there is a smaller surface area, the oscillating shower moves faster than at the exterior of the disc where the surface area is greater.

14 Claims, 10 Drawing Sheets

U.S. PATENT DOCUMENTS

| | | |
|---|---|---|
| 1,777,648 | 10/1930 | McKay et al. . |
| 1,796,491 | 3/1931 | Sweetland . |
| 1,882,178 | 10/1932 | Cumberland . |
| 2,079,755 | 5/1937 | Wood . |
| 2,184,451 | 12/1939 | Genter . |
| 2,197,509 | 4/1940 | Reilly et al. . |
| 2,544,402 | 3/1951 | Tessmer . |
| 2,565,388 | 8/1951 | McCaskell . |
| 2,576,288 | 11/1951 | Bench . |
| 2,588,677 | 3/1952 | Welty et al. . |
| 2,593,707 | 4/1952 | Walker . |
| 2,696,916 | 12/1954 | Peterson et al. . |
| 2,699,872 | 1/1955 | Kelsey . |
| 2,741,369 | 4/1956 | Fest . |
| 2,864,503 | 12/1958 | Hunter . |
| 2,899,066 | 8/1959 | Peterson et al. . |
| 2,899,068 | 8/1959 | King et al. . |
| 2,969,880 | 1/1961 | Lundholm et al. . |
| 3,137,652 | 6/1964 | Graue . |
| 3,187,899 | 6/1965 | Prizler . |
| 3,190,452 | 6/1965 | Martin . |
| 3,217,882 | 11/1965 | Ogletree . |
| 3,252,577 | 5/1966 | Anderson . |
| 3,289,467 | 12/1966 | Parker et al. . |
| 3,373,877 | 3/1968 | Stewart et al. . |
| 3,542,205 | 11/1970 | O'Cheskey . |
| 3,793,690 | 2/1974 | Wayne . |
| 3,810,604 | 5/1974 | Reiter . |
| 3,869,389 | 3/1975 | Rokitansky . |
| 4,066,554 | 1/1978 | Guyer . |
| 4,115,265 | 9/1978 | Otte et al. . |
| 4,128,206 | 12/1978 | Bintner . |
| 4,218,322 | 8/1980 | Kojima . |
| 4,279,760 | 7/1981 | Yamamoto . |
| 4,332,680 | 6/1982 | O'Cheskey . |
| 4,407,720 | 10/1983 | Bratten . |
| 4,450,080 | 5/1984 | Dodd . |
| 4,501,659 | 2/1985 | Henk . |
| 4,556,487 | 12/1985 | Ueda . |
| 4,695,381 | 9/1987 | Ragnegard . |
| 4,697,292 | 10/1987 | LaValley . |
| 4,702,845 | 10/1987 | Wykoff . |
| 4,735,730 | 4/1988 | Bratten . |
| 4,747,961 | 5/1988 | Beer et al. . |
| 4,839,047 | 6/1989 | Shishkin et al. . |
| 4,929,355 | 5/1990 | Regnegard et al. . |
| 4,957,630 | 9/1990 | Bratten . |
| 4,986,881 | 1/1991 | Funk . |
| 5,149,448 | 9/1992 | Mattelmaki . |
| 5,151,176 | 9/1992 | Strid et al. . |
| 5,221,469 | 6/1993 | Nehls . |
| 5,227,064 | 7/1993 | Strid . |
| 5,227,075 | 7/1993 | Ostman . |
| 5,374,360 | 12/1994 | Weis . |
| 5,464,542 | 11/1995 | Grienberger et al. . |
| 5,470,472 | 11/1995 | Baird et al. . |
| 5,470,473 | 11/1995 | Park et al. . |
| 5,589,079 | 12/1996 | Park et al. . |
| B1 4,501,659 | 9/1986 | Henk . |

UNIFORM AREA SHOWER FOR DISC FILTER

This application is a continuation-in-part of U.S. application Ser. No. 08/729,922, filed on Oct. 15, 1996, now abandoned, and a continuation-in-part of U.S. application Ser. No. 08/729,922, filed Oct. 15, 1996, now abandoned, and a continuation-in-part of U.S. application Ser. No. 08/991,684, filed Dec. 16, 1997, now U.S. Pat. No. 5,968,372, which claims the benefit of U.S. Provisional Application Ser. No. 60/033,097, filed Dec. 16, 1996. The above referenced applications are incorporated herein by reference in their entirety.

BACKGROUND OF THE INVENTION

1. Field of the Invention

The invention relates generally to a spray washer for a disc filter and more particularly to a washer that washes the slurry layer on the media of a disc filter.

2. Prior Art

Figure 1:
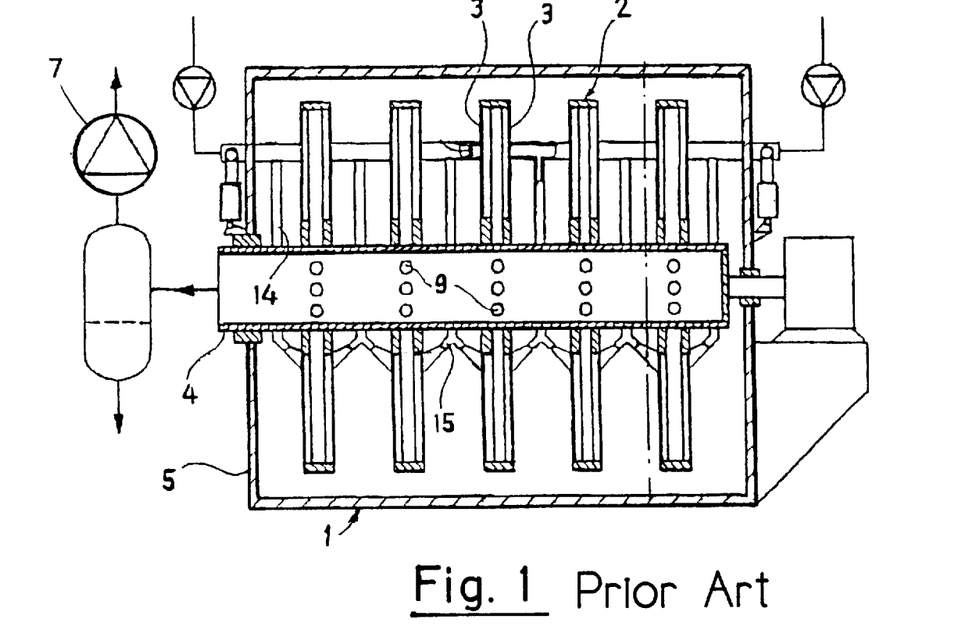
FIG. 1 is a cross-sectional side view of a prior art conventional disc filter.

Disc filters for separating solid particles from liquid are known in the art. Published International Patent application WO 93/23140 discloses a conventional rotatable disc filter. As shown in FIG. 1, the disc filter includes a plurality of hollow discs 2 having side walls 3 of a filter material. The hollow discs 2 are coupled to a hollow axle 4 through holes 9. The discs 2 are positioned within a container 5 which has an inlet 6 (shown in FIG. 2) for introducing a slurry of liquid containing solid particles into the container 5. A vacuum pump 7 draws the liquid through the discs 2. The solid particles accumulate on the surface of the filter material 3, thereby separating the liquid from the solid particles.

Figure 2:
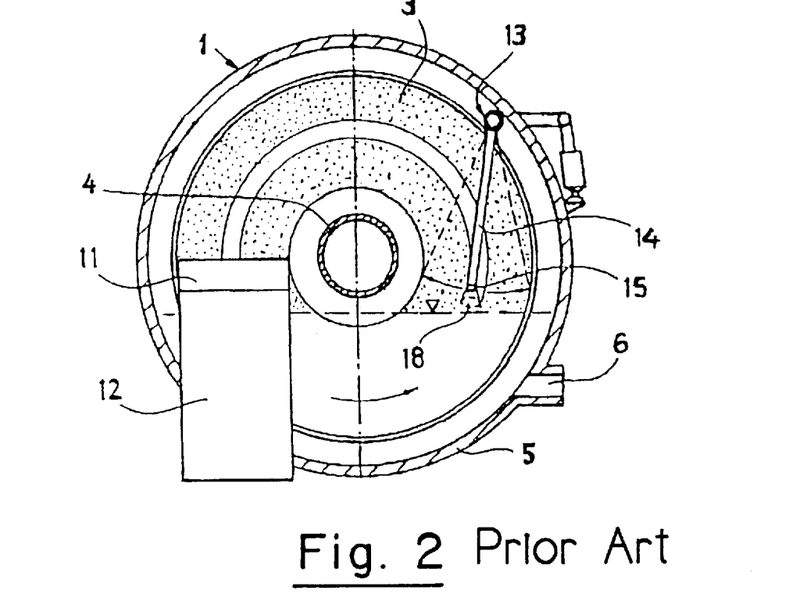
FIG. 2 is a cross-sectional end view of the prior art conventional disc filter.

As shown in FIG. 2, the container 5 is filled approximately half way with the slurry. Sections of the disc 2 rotate counter-clockwise, enter the slurry and emerge coated with solid material. A scraper 11 is used to remove solid material formed on the disc 2. It is desirable to leave a certain amount of the solid material, referred to as the precoat, on the disc 2. The precoat acts as an additional filter. The scraper 11 removes a layer of solid material (referred to as the cake layer) formed on top of the precoat layer The cake falls into a chute 12 and is transferred away from the filter using known conveyance mechanisms.

After the filter has been running for some time, the precoat layer becomes less permeable and does not provide adequate filtering. Accordingly, it is necessary to periodically remove the precoat layer. The disc filter shown in FIG. 2 accomplishes removal of the precoat layer by using an oscillating spray pipe 14 fitted with a spray nozzle 15. The spray nozzle 15 moves between the periphery and center of the disc 2, sprays water on the disc 2, and removes the precoat layer.

The use of an oscillating shower to remove solid material from a disc filter is also described in U.S. Pat. Nos. 3,252,577 and 4,332,680. A problem common to all these devices is that the shower arm moves at a fixed speed. Because there is much less disc surface area at the interior of the disc, more water than necessary is applied to the inner portion of the disc which wastes water. If the speed of the oscillating shower is increased to correspond to the interior region of the disc, then insufficient spray is achieved at the outer region of the disc.

Figure 3:
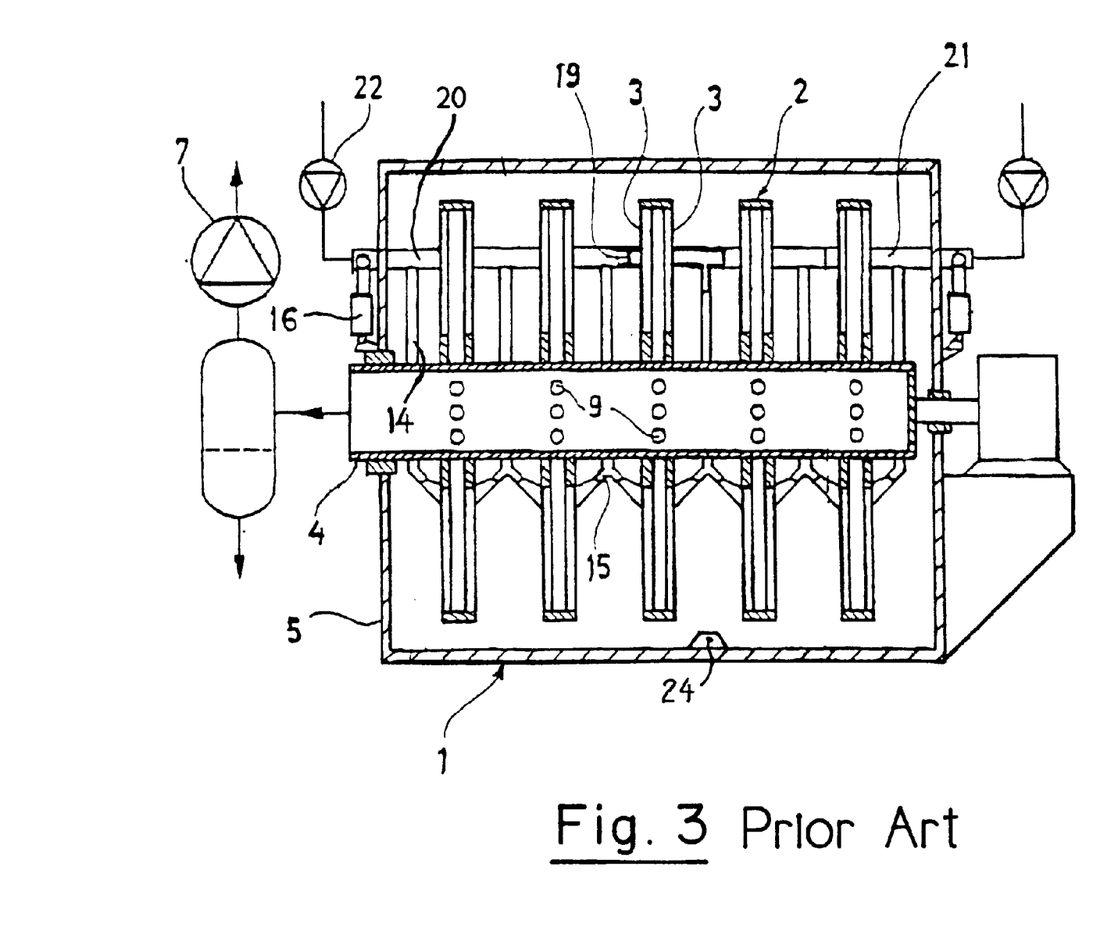
FIG. 3 is a cross-sectional side view of a prior art conventional disc filter including an agitator.

The disc filter shown in FIGS. 1 and 2 may also be equipped with an agitator as shown in FIG. 3. In order for the disc filter to operate efficiently, the solid particles must be distributed throughout the liquid. This allows the solid particles to contact the entire surface area of the disc 2 and provides for optimal filtering. In addition, the agitation prevents the solid particles from accumulating at the bottom of the container 5 and forming a solid mass. As shown in FIG. 3, an agitator 24 is placed in the container 5. Air is forced through the agitator 24 in order to agitate the slurry. However, using air as the source of the agitation has drawbacks. The liquid in the disc filter is forced towards the discs 2 through pressure in the container 5. As the liquid passes through the disc there is a pressure drop. Air bubbles entrained in the liquid will expand at this point and as a result will partially block the passage of the liquid in the precoat, and thereby reduce the filter capacity.

SUMMARY OF THE INVENTION

The above-discussed and other drawbacks and deficiencies of the prior art are overcome or alleviated by the disc filter system of the present invention. In accordance with the present invention, the disc filter includes showers that periodically remove the precoat layer of solids from the filter discs. Each shower moves over the surface of the disc at a varying speed so that water is uniformly sprayed on the interior and exterior of the disc. At the interior of the disc, where there is a smaller surface area, the oscillating shower moves faster than at the exterior of the disc where the surface area is greater. In other words, the speed of the shower is inversely proportional to the surface area of the disc adjacent the shower.

In one embodiment the uniform area shower comprises a oscillating shower that is pivotly mounted and travels radially over the disc. In an alternative embodiment the uniform area shower comprises a traversing shower that mounts to a carriage and travels radially over the disc. The disc filter also includes an agitator that forces a portion of the input slurry through a nozzle and eductor assembly. The output of the eductor assembly agitates the slurry in the container and prevents the solid particles from settling in the bottom of the container.

The shower that oscillates at varying speeds sprays a uniform amount of water on the surface of the disc. This reduces the amount of water used in removing the precoat layer and reduces the number of nozzles. Reducing the number of nozzles decreases the initial and maintenance costs for the disc filter.

The eductor agitator receives the input slurry and uses a portion of the slurry inside the filter vessel to agitate the contents of the disc filter. This eliminates the source of compressed air previously used for agitation and thus reduces the energy consumption of the disc filter. The filter capacity is also improved by not introducing air into the slurry.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 4:
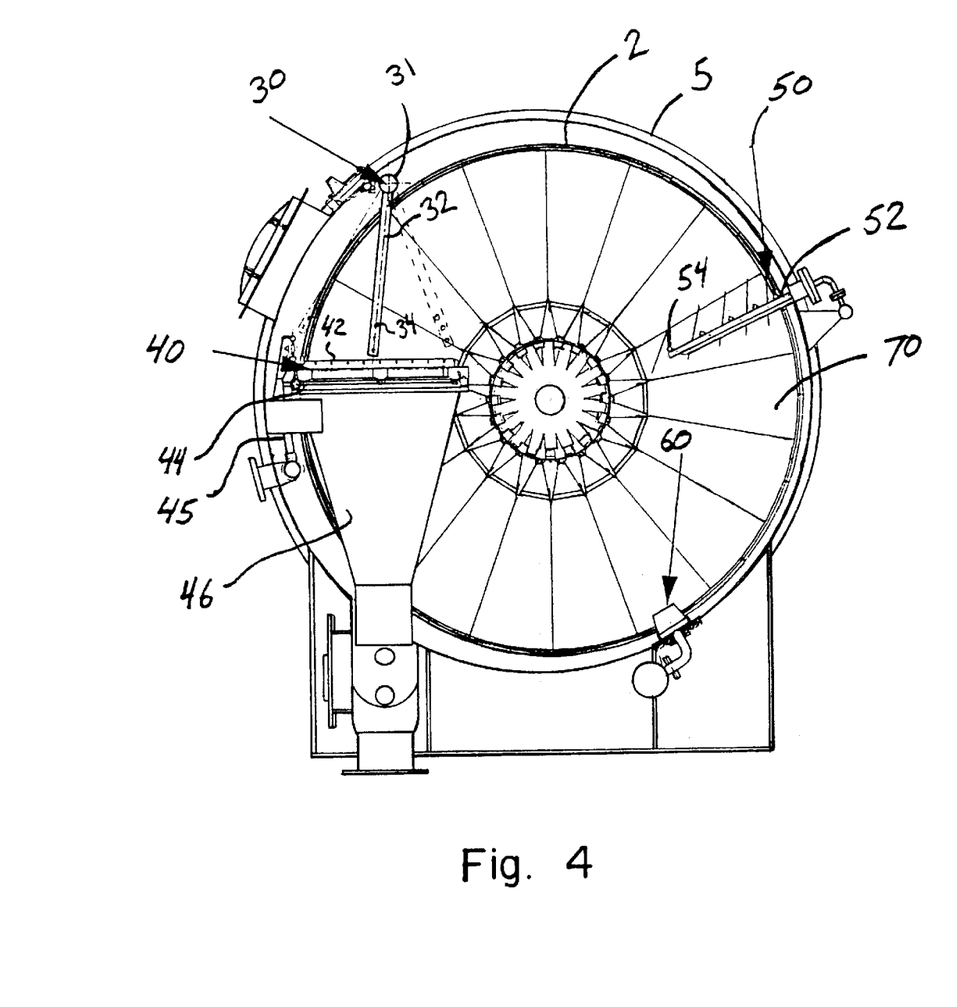
FIG. 4 is a cross-sectional end view of the disc filter of the present invention showing an oscillating shower.

FIG. 4 is cross-sectional end view of the disc filter of the present invention. The disc filter includes at least one disc 2. The disc 2 is similar to those described in the prior art in that solid material is removed from liquid by forcing the liquid through filtering discs 2. The liquid is forced through the discs 2 by creating a pressure differential between the container or vessel 5 and the interior of discs 2 (e.g. by pressurizing container 5 or creating a vacuum in the interior of discs 2). The discs 2 may be a perforated material such as metal and covered with a filter material such as polypropylene. The filter material is referred to generally as the filter cloth. Each disc 2 is divided into disc sectors 70 which are covered with the filter cloth. The discs 2 are positioned within a container 5 that holds the solid/liquid slurry. The level of the slurry can vary but typically is approximately the center of the disc 2. As the discs 2 rotate, each sector 70 fully enters the slurry and an amount of solid material is deposited on the surface of each disc sector 70. The solid material is then removed from each sector 70 to separate the solid from the liquid.

An embodiment of uniform area shower 30 includes an oscillating shower wand 32 having shower nozzles 34. The oscillating shower 30 is used to remove the precoat layer of solids formed on the surface of the disc 2. During normal filtering, the oscillating shower 30 is not used. At the end of a filtering cycle, the precoat layer has become impervious to effectively filter and must be removed. The container 5 is drained, the disc 2 is rotated counter-clockwise (as shown of FIG. 4) at a low speed and the oscillating shower removes the precoat layer formed on the disc 2. In accordance with an important feature of the present invention, the oscillating shower uniformly sprays the surface of the disc 2 at a varying speed and in a predetermined pattern. The oscillating shower moves across the disc 2 in a series of radial cleaning positions relative to the surface of the disc. The details of the oscillation pattern of the oscillating shower 30 are described below with reference to FIGS. 8A–8C.

A scraper mechanism 40 includes a blade 42 that removes the cake layer from the precoat layer. During filtration, the disc 2 rotates counter-clockwise (as shown on FIG. 4). As each disc sector 70 passes through the slurry and emerges from the slurry, additional solid material is deposited on the surface of the disc sector 70. As the disc sectors 70 pass the scraper blade 42, the cake layer formed on top of the precoat layer is removed. The removed solid material falls into the chute 46. A chute shower 44 sprays water into the chute 46 and allows the solid material to slide towards the bottom of the chute 46. The solid material is sluiced down into the lime mud mix tank, using chute sprays and recirculated slurry from the mix tank.

Figure 10:
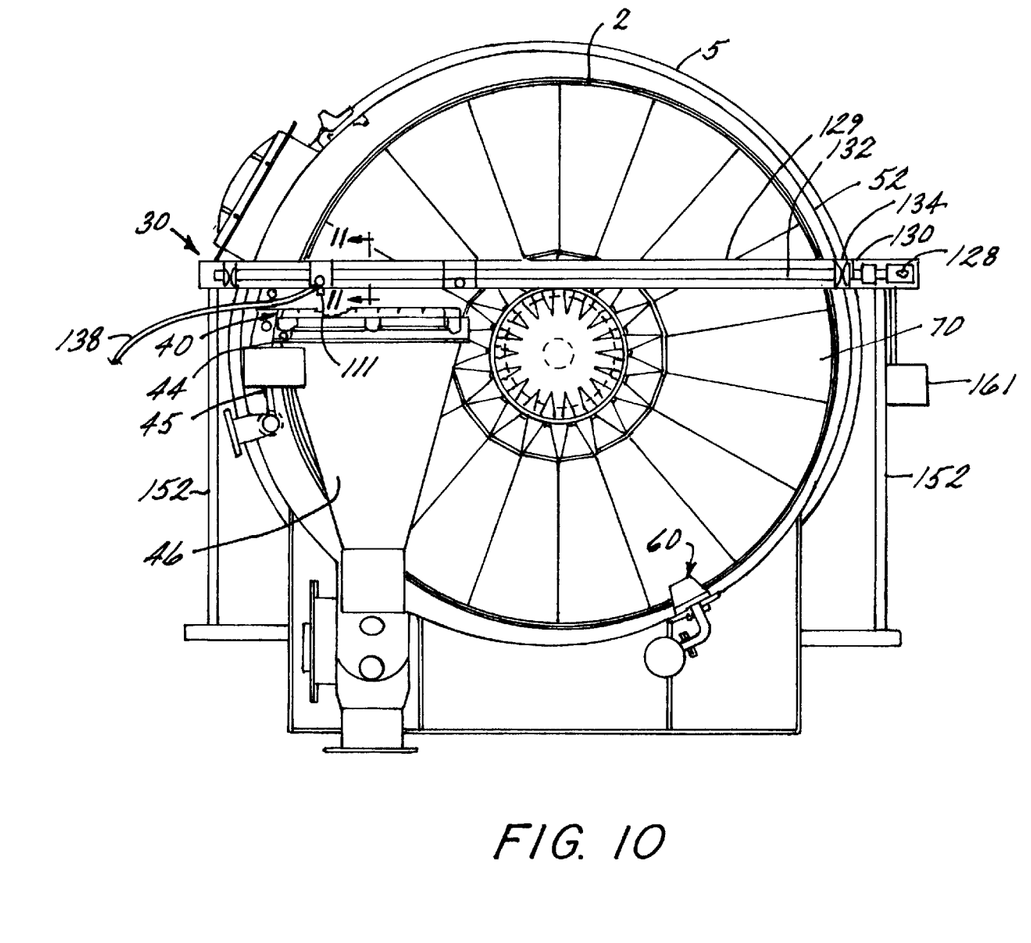
FIG. 10 is a cross-sectional end view of the disc filter of the present invention showing a traversing shower.

Referring to FIG. 10, another embodiment shower 30 of the invention is illustrated. In this embodiment, one or more nozzle 111 are mounted on a fluid supply conduit or shower bar and are similar in performance to nozzles 34 described herein above. At each nozzle location, preferably, there are two nozzle 111, one immediately under the other discussed more fully hereunder. Traversing shower bar includes flanges; one flange being circumferentially opposite the other flange. The flanges ride in tracks (preferably low friction plastic). The tracks are positioned along shower bar at advantageous areas to provide support. The tracks are mounted preferably on angle iron brackets, which are spaced from the main support channel by spacer brackets. The length of spacer brackets is determined by the distance main support channel 129 is located from the filter disc 2 and the desired proximity of the nozzle 111 to disc 2. Spacer brackets are preferably welded to angle iron brackets and preferably welded to flat stock for bolting to main support channel 129 with bolts. It should be noted that the entire traversing shower assembly 30 described herein is mounted on main support channel 129 which is affixed to the vat of disc filter 2 preferably by bolts to end supports 152 which are welded onto the vat of filter 2.

Channel 129 extends outside of the container 5 to provide support for motor drive 128, torque converter 130 and lead screw or jack shaft 132. Lead screw 132 preferably runs from one side of the filter to the other. On either side of lead screw or jack shaft 132 are support members 134, preferably pillow block bearings, that act to rotatably support the lead screw 132. In this particular embodiment motor 128 and jack screw 132 are the drive mechanism for the shower transporting the shower over the surface of the disc.

Shower bar is moveable in reciprocating fashion traversing across disc filter 2 as hereinbefore stated. Such movement is occasioned by the impetus of lead screw 132 and is translated to the bar through the carrier. The carrier includes a rigid section of tubing attached to the carrier, preferably with bolts (could be welded), to provide a fixed connection for the bar while keeping flexible hose 138 out of the way of lead screw 132. The carrier is threadedly engaged to lead screw 132 by the nut which is fixedly connected to the carrier. Hose 138, essentially a feed pipe, feeds the shower bar with wash fluid which is preferably water. High pressure hose 138 provides sufficient excess length to allow for movement of the carrier of at least the radius of disc 2. It should be noted that the drive motor 128 of the present invention need only be a fractional horsepower motor as the carrier and the bar are extremely light and easy to move. The motor is variably actuated by controller 161 to adjust speed of the washing shower as the nozzle 111 traversed across disk 2.

Referring to FIG. 11, spray nozzles 110 and 111 are illustrated. Preferably, nozzle 111 has an angle between each stream emitted from said nozzle(s) of approximately twenty to forty degrees measured from the horizontal. In a preferred embodiment the angle between nozzles is approximately thirty-eight degrees. One nozzle, the top nozzle as depicted in the drawing, is horizontal and the second nozzle 111 is directed downward therefrom the indicated number of degrees. As can be easily understood from FIG. 10 this embodiment of the invention is positioned above chute shower 44 and chute 46 as in the embodiment discussed herein above. Brackets 152 may be attached in any number of ways and preferably are welded to container 5.

Referring again to FIG. 4, a wash shower 50 is an optional addition to the disc filter. The wash shower includes a wash pipe 52 and a plurality of wash shower nozzles 54. The wash shower nozzles 54 spray water at the solid material formed on the disc sectors 70 as each disc sector 70 while it is in the slurry. When each disc sector 70 emerges from the slurry, it contains both the solid and some of the liquid. Wash shower 50 replaces a portion of the liquid with water thereby preventing the liquid which contain higher concentration of chemicals from being discarded in chute 40. This increases the filtering efficiency of the disc filter.

Figure 6:
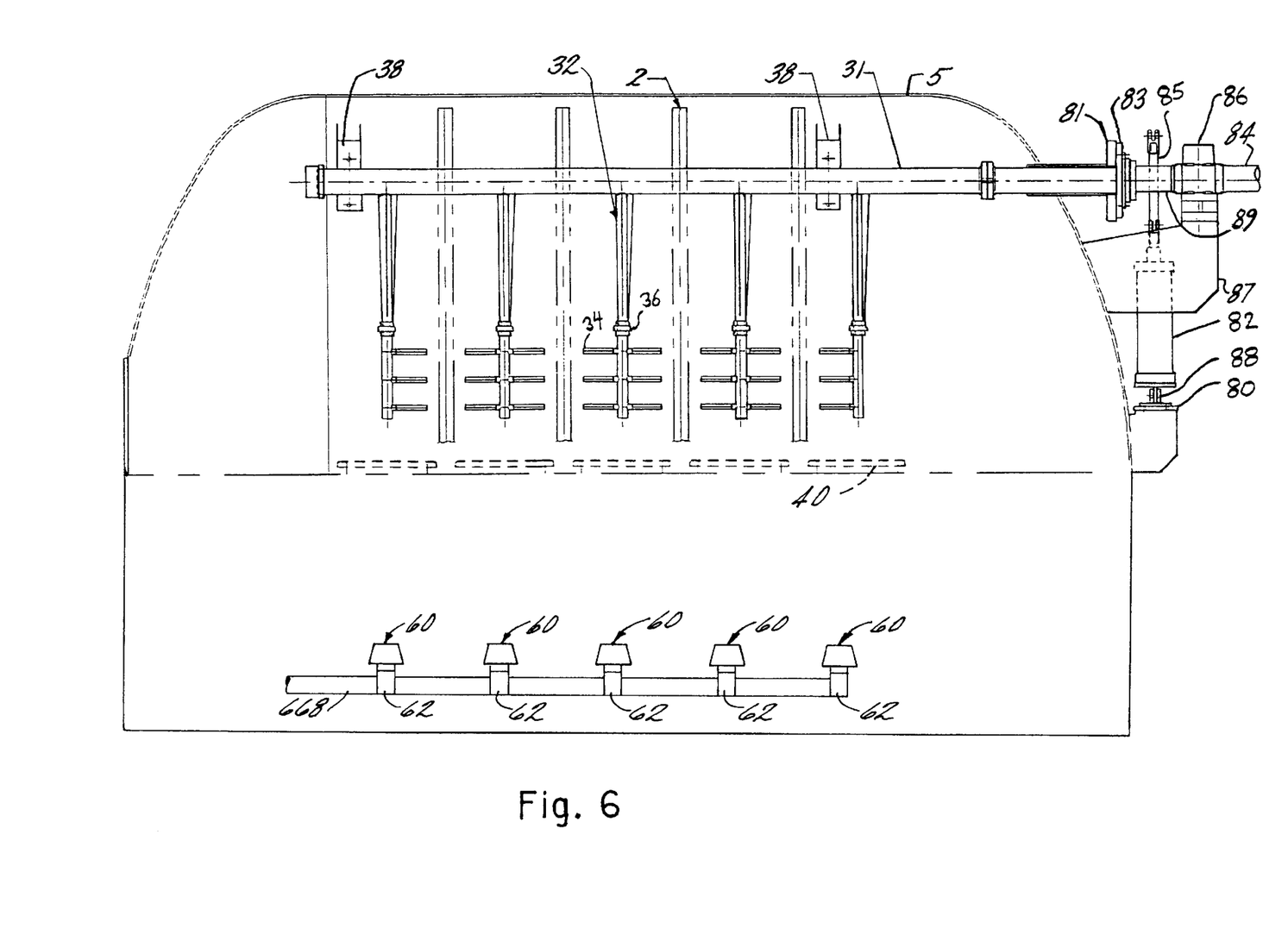
FIG. 6 is a cross-sectional side view of the disc filter of FIG. 4.
Figure 9:
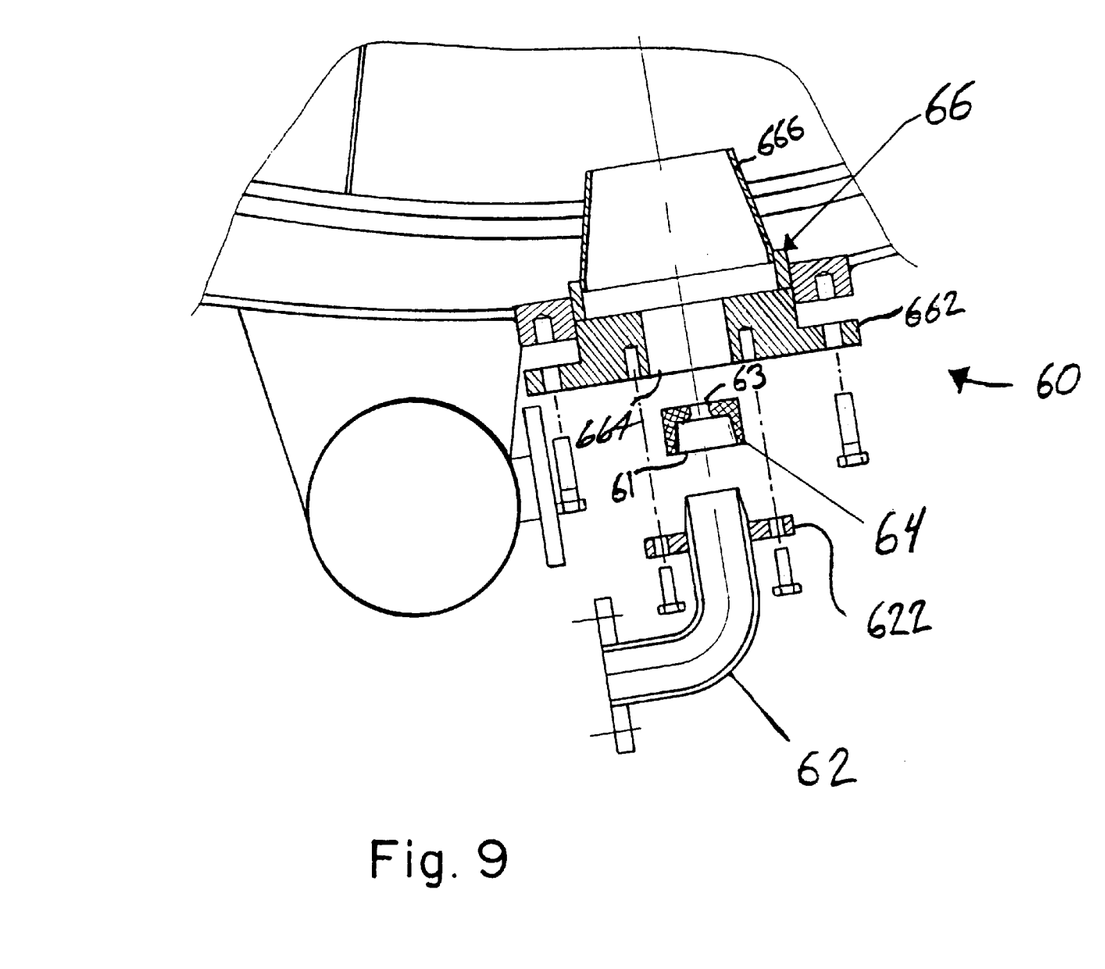
FIG. 9 is an enlarged, exploded view of an eductor agitator.

In accordance with yet an another important feature of this invention and with reference to FIGS. 4, 6 & 9, an eductor agitator 60, as is commonly known in the art, agitates the slurry in the container 5. If the slurry is not agitated, the solid material will collect at the bottom of the container 5 reducing the filter efficiency. The solid material that accumulates at the bottom of the container 5 can be extremely difficult to remove and can cause mechanical problems. The eductor agitator 60 receives the input slurry from the disc filter inlet pipe and a portion of the slurry in the vessel through openings 65 (FIG. 6) in the direction indicated by arrows 67 and emits a stream of slurry towards the center of the vessel. Openings 65 are preferably positioned around the periphery of eductor outlet 666 as shown in FIG. 6. This sufficiently agitates the slurry to prevent settling of the solid material but does not require the deleterious use of air which conventional systems have used as described above. In a preferred embodiment, an eductor agitator 60 is positioned at each side of each disc.

The operation of the disc filter will now be summarized with respect to the embodiment shown in FIG. 4. The liquid/solid slurry is fed into the container 5 through an inlet pipe. The container 5 is then pressurized and the discs 2 are rotated counter-clockwise (as shown in FIG. 4). As the disc sectors 70 emerge from the slurry, they are coated with a cake of the solid material and liquid. The wash shower 50, if used, displaces the liquid to prevent the liquid from being discarded down chute 40. The cake layer formed on top of the precoat layer is then removed by scraper blade 42. This process continues for a desired time period until the precoat layer becomes too impervious and must be removed to sustain filter capacity. At this time, the container is drained, the discs 2 are slowly rotated, and the oscillating shower 30 (or the traversing shower of FIG. 10) removes the precoat layer. Once the precoat layer is removed, the filtering process is resumed.

Figure 4A:
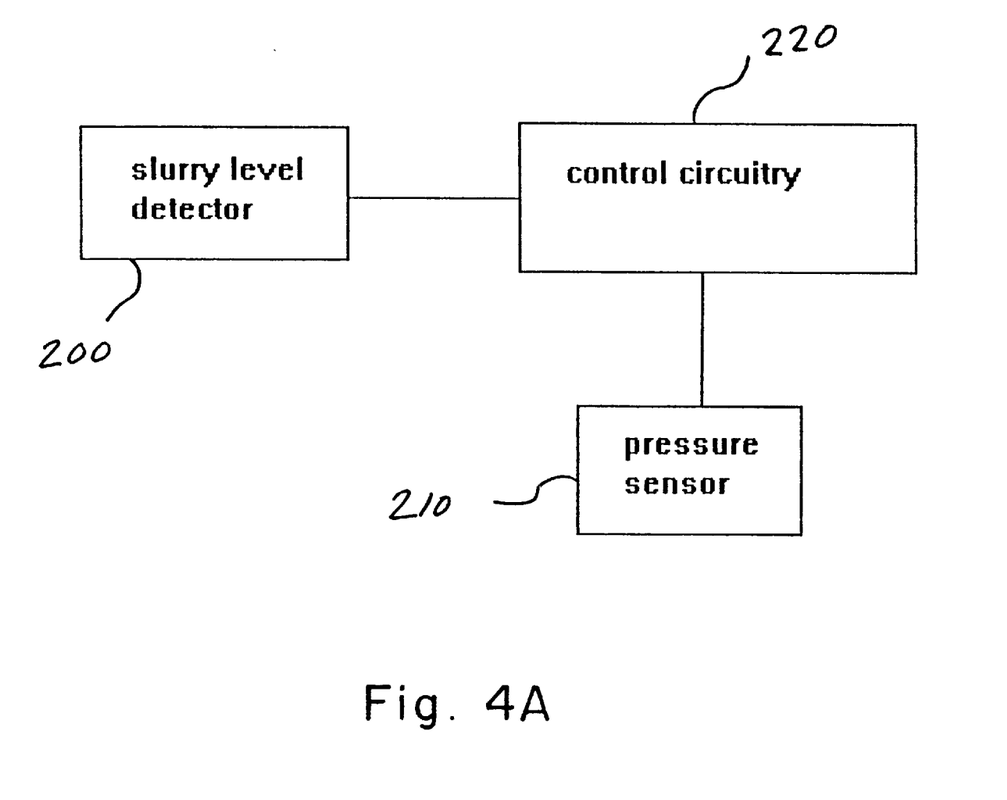
FIG. 4A is a block diagram of the disc filter control system.

Instead of removing the precoat at the end of the filtering cycle, the decision to initiate the uniform area shower 30 may be made automatically by control circuitry. When either a high slurry level or a pressure drop is detected by control circuitry, the oscillating shower is activated. As shown in FIG. 4A, a slurry level sensor 200 positioned within the container 5 detects the level of the slurry. A pressure sensor 210 detects if the pressure in the vacuum system is increasing. Both these conditions indicate that flow through the filter discs 2 is impeded and that the filter sectors 70 need cleaning. Upon detection of one or both of these conditions, the control circuitry 220 initiates the precoat removal cycle.

Figure 5:
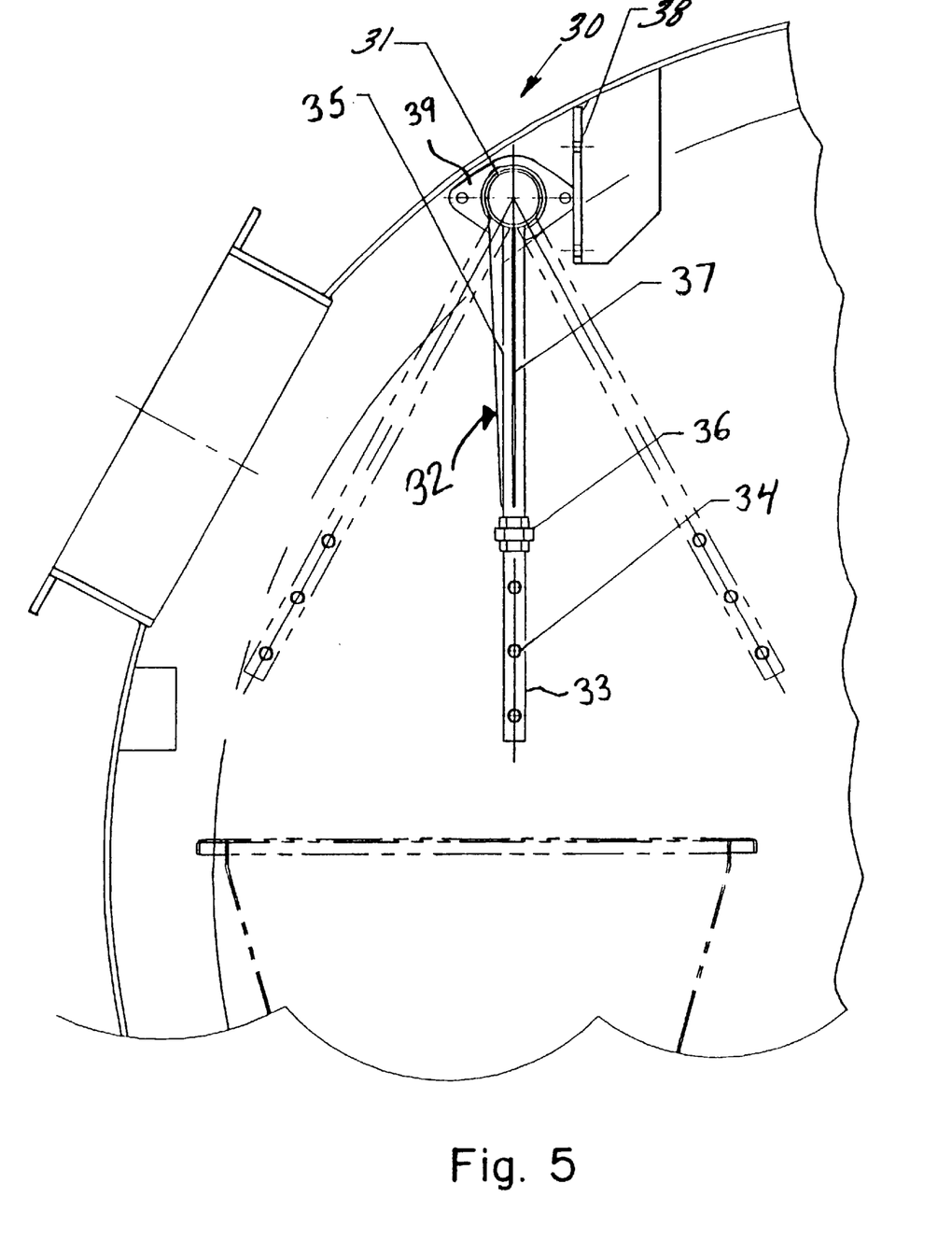
FIG. 5 is an enlarged view of the oscillating shower wand.

FIG. 5 is an enlarged view of the oscillating shower 30 shown in FIG. 4. The oscillating shower wand 32 is made up of an upper section 35 and a nozzle section 33. These two sections of pipe are joined through coupler 36 which has threads formed in both ends. The coupler 36 allows the nozzle section 33 to be removed from the upper section 35 for replacement and/or maintenance of nozzles 34. The nozzles 34 are formed on the nozzle section 33 and direct water away from the nozzle section 33 towards the surface of the discs 2. Gussets 37 are formed on the upper section 35 to strengthen the oscillating shower wand 32. The oscillating shower wand 32 receives water from the high pressure pipe 31. The high pressure pipe 31 is mounted in bearings 39 which are supported by bearing brackets 38. FIG. 5 shows the oscillating shower wand 32 in three positions.

FIG. 6 is a side cross-sectional view of the disc filter. As described above, the oscillating shower wands 32 are coupled to a high pressure pipe 31. The high pressure pipe 31 rotates within bearings 39 (shown in FIG. 5) which are supported by bearing support brackets 38. The oscillating shower wands 32 are positioned adjacent to each surface of the discs 2. Nozzles 34 extend away from the oscillating shower wand 32 and direct a spray of water at the surface of the discs 2. The precoat layer removed by nozzles 34 falls into chutes 40 as previously described.

The oscillating shower wands 32 are driven by a drive mechanism, shown by way of example as a pneumatic actuator 82 which is mounted on an actuator support 80. The pneumatic actuator 82 is controlled by controller 161 and drives an actuator arm 85 which oscillates the high pressure pipe 31. A feed pipe 84 provides water to the high pressure pipe 31. The feed pipe includes a rotating section 89 which is coupled to the high pressure pipe 31. A bearing/swivel joint 86 couples the rotating section 89 to the feed pipe 84 and allows water to pass from the feed pipe 84 to the rotating section 89 and allows the rotating section 89 to rotate relative to the feed pipe 84. The bearing/swivel joint 86 is mounted to a support bearing bracket 87. The rotating section 89 is connected to the high pressure pipe 31 through a split seal 83 and a seal mounting plate 81. The seal mounting plate 81 seals the container 5 at the area where the high pressure pipe 31 extends through the container wall. As the actuator arm 85 is driven up and down, the feed pipe 84 remains stationary while the rotating section 89 and the high pressure pipe 31 are rotated.

Figure 7:
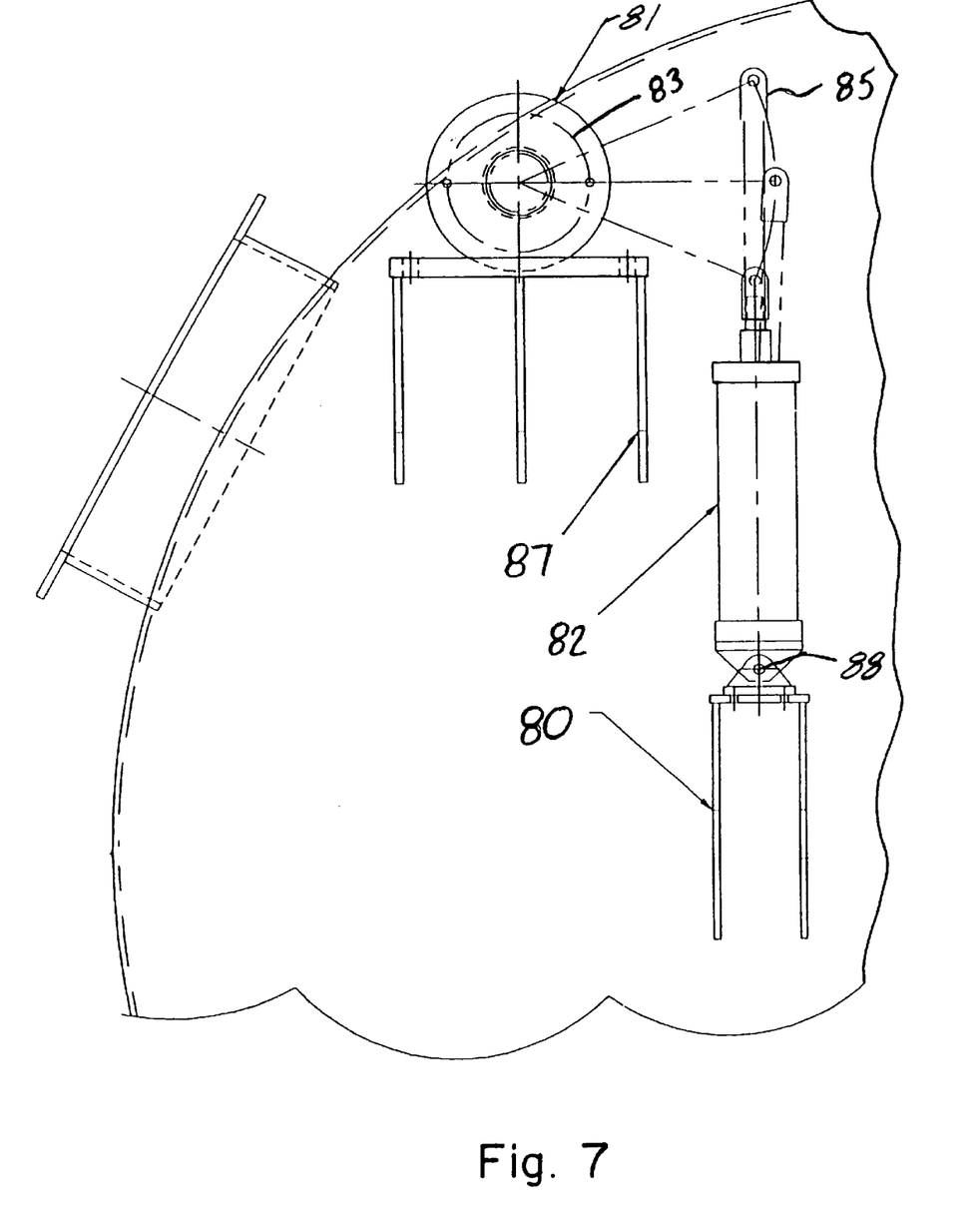
FIG. 7 is an enlarged view of the oscillating shower actuator.

FIG. 7 is an enlarged end view of the region including the pneumatic actuator 82. The bearing/swivel joint 86 is not shown in FIG. 7 for clarity. The pneumatic actuator 82 is mounted to a pivot joint 88 which allows the pneumatic actuator to move away from the rotating section 89 as needed. The actuator arm 85 is connected to the rotating section 89 through a connection arm (not shown in the drawings) welded to the rotating section 89 and rotatably coupled to the actuator arm 85. As previously described, as the actuator arm 85 moves up and down, the rotating section 89 rotates and causes the high pressure pipe 31 to rotate in an oscillatory manner. The rotation of the high pressure pipe 31 oscillates the oscillating shower wands 32 over the surfaces of discs 2.

Figure 8A:
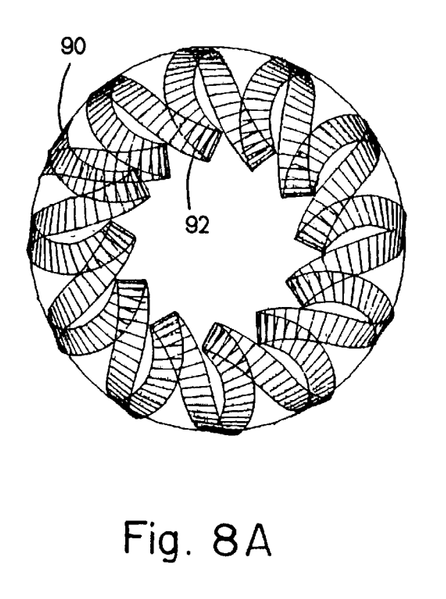
FIGS. 8A–8C illustrate the path and speed of the oscillating shower over the filter discs for first and subsequent passes.
Figure 8B:
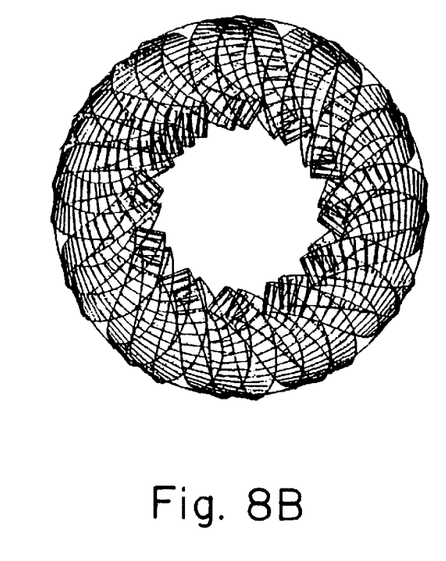
Figure 8C:
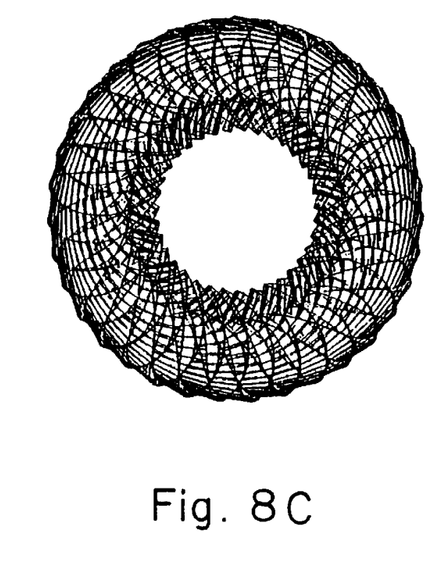

FIGS. 8A–8C illustrate the path followed by the oscillating shower nozzles 34 over the surface of a disc 2 (shown in FIG. 4). FIG. 8A illustrates a single pass by the oscillating shower, FIG. 8B illustrates a double pass and FIG. 8C illustrates a triple pass. The path of the oscillating shower nozzles 34 is shown by track 90. The oscillating shower wand 32 travels between a first radial position and a second radial position on the surface of the disc 2. As shown in FIG. 8A, the first radial position is at or near the periphery of the disc 2. The second radial position is near the center of the disc 2.

The track 90 is divided into a plurality of track sections 92 that indicate the distance that the shower nozzles 34 travel per unit time and defining a series of radial cleaning positions. As shown in FIG. 8A, the track sections 92 near the center of the disc are larger than the track sections 92 at the periphery of the disc. The shower nozzles 34 move faster near the center of the disc than at the periphery of the disc. The pneumatic arm 85 is controlled by controller 161 to be driven faster when the nozzles 34 are near the center of the disc and slower when the nozzles 34 are near the periphery of the disc. There is less surface area near the center of the disc 2 and thus, the nozzles 34 moves faster near the center of the disc and still effectively spray the disc surface. As the surface area increases away from the center of the disc, the nozzles 34 slow down in order to achieve uniform coverage of the disc surface. The speed of the oscillating shower wand 32 is dependent upon the radial position of the oscillating shower wand 32. FIG. 8B illustrates the amount of coverage when the oscillating shower makes two passes over the surface of the disc. FIG. 8C illustrates that the entire disc surface is covered when the oscillating shower makes three passes over the surface of the disc. Accordingly, disc 2 is cleaned by nozzles 34 by passing the nozzles over the surface of the disc through the series of radial cleaning positions. The oscillation is controlled such that the time spent by the nozzles at each position is generally proportional to the distance from the center of the disc to the nozzle such that the surface is cleaned uniformly.

In the traversing shower 30 shown in FIG. 10 motor 128 is similarly controlled by controller 161 which in turn is enabled by control circuitry as described herein above. Controller 161 controls both the rotational speed and direction of motor 128. Controller 161 is preprogrammed to rotate and thereby turn jack screw 132 in a first direction translating the carrier across disc 2 from the periphery of the disc to the center of the disc. Controller 161 then commands motor 128 to switch direction and translate the carrier from the center of disc 2 to the periphery of the disc. Controller 161 further controls the rotational speed of motor 128 such that the motor rotates faster when the carrier is near the center of disc 2 and slower when the carriage is near the periphery of the disc. By controlling the speed of motor 128 in the manner described, nozzle(s) 111 provides wash coverage to a uniform cross section of disc 2 tracing out a pattern similar to that shown in FIGS. 8A–8C. Specifically the speed of motor 128 is controlled to have an inverse relationship with the cross sectional area of segment 70. Accordingly, nozzle(s) 111 moves across the surface of disc 2 through a series of radial cleaning positions such that the time spent at each position is proportional to the distance from the center of the disc to the nozzles to uniformly clean the surface of the disc.

The variance in the speed of the shower nozzles provides several advantages. Less nozzles are needed to effectively cover the surface of the disc as compared to stationary showers. This reduces the costs of manufacturing and maintaining nozzles. In addition, less water is used by the varying speed oscillating shower than conventional fixed speed showers. Further, it provides a more thorough job cleaning the surface, without leaving uncleaned areas.

FIG. 9 is an enlarged, exploded view of the eductor agitator 60 shown in FIG. 4. The eductor agitator 60 includes an eductor inlet pipe 62. The eductor inlet pipe 62 is fed from the main inlet pipe that provides the slurry to the container 5. This eliminates the source of compressed air used in the prior art systems and reduces energy consumption.

The eductor inlet pipe 62 is coupled to an eductor nozzle 64 which increases the speed of the slurry. The eductor nozzle 64 is mounted on the eductor inlet pipe 62. The inlet pipe has a flange 622 which provides for mounting the inlet pipe 62 and the nozzle 64 to an eductor assembly 66. The eductor assembly 66 has a flange 662 which provides an area for mounting the eductor assembly 66 to the container wall. An eductor inlet 664 is a cylindrical opening having an inner diameter slightly larger than the outer diameter of the nozzle 64. The feed slurry is fed from the feed pipe into the inlet pipe 62 and through the nozzle 64. The nozzle 64 directs the feed through the center of the eductor assembly 66. This creates a low pressure zone in the eductor assembly which draws additional slurry already in the container through the eductor assembly 66. Hence, the flow out of the eductor assembly 66 is increased multiple times in relation to the feed slurry flow emitted from the eductor nozzle 64. A plurality of eductor agitators 60 are placed within the container 5. As shown in FIG. 6, an eductor agitator 60 is preferably placed at each side of each disc 2. In this way, the slurry near each disc 2 surface is agitated. The eductor agitators 60 may be fed individually or from a common header pipe 668.

In accordance with the present invention, the oscillating shower uses variable speed to uniformly apply water to the entire surface of the discs in a disc filter. Near the periphery of the disc, the oscillating shower moves slower than near the center of the disc due to the larger amount of surface area per degree at the periphery of the circular disc. This variation in speed reduces the amount of water used and reduces the number of nozzles necessary to distribute the water. In accordance with still another feature of this invention, the disc filter includes eductor agitators that maintain the solid material in suspension so that filtering efficiency is increased. The eductor agitators also prevent the solid material from accumulating at the bottom of the container.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A cleaning system for use with a disc filter including at least one disc mounted for rotation, the cleaning system comprising:

a shower having at least one nozzle directing liquid at the disc;

a drive mechanism transporting the shower through a series of radial cleaning positions relative to a surface of the disc; and a controller controlling the drive mechanism to vary the speed of transport of the shower across the surface of the disc such that the time spent by the shower cleaning the disc at a radial cleaning position is generally proportional to the radial distance of the cleaning position from the center of the disc, whereby the surface of the disc is cleaned generally uniformly over the extent of the surface.

2. The cleaning system of claim 1 wherein the shower travels along a generally radial path across the surface of the disc.

3. The cleaning system of claim 2 wherein the drive mechanism transports the shower from a first radial cleaning position toward the center of the disc to a second radial cleaning position near the periphery of the disc.

4. The cleaning system of claim 3 wherein the speed of transport of the shower is greater at the first radial location than at the second radial location.

5. The cleaning system of claim 1 wherein the shower is connected to a source of wash liquid under pressure.

6. The cleaning system of claim 5 wherein the drive mechanism comprises a wand carrying the nozzle pivotly mounted adjacent the disc filter, and an actuator for oscillating the wand.

7. The cleaning system of claim 6 wherein the wand comprises a pivoted section toward and a pivoted end and nozzle section removably secured to the pivoted section.

8. The cleaning system of claim 7 wherein the pivoted section is connected to the source of wash liquid under pressure.

9. The cleaning system of claim 5 wherein the shower comprises a traversing shower having a movable carrier and wherein the drive mechanism supports and transports the carrier in a generally reciprocating motion across the surface of the disc.

10. The cleaning system of claim 9 wherein the shower comprises a nozzle on the carrier and connected to the source of cleaning liquid.

11. The cleaning system of claim 10 wherein the drive mechanism comprises:
   a motor controlled by the controller;
   a lead screw coupled to the motor having external threads disposed thereon; and
   a set of internal threads disposed within the carrier threadably engaged with the external threads of the lead screw.

12. The cleaning system of claim 10 further comprising a flexible hose connecting the source of wash liquid.

13. A method for removing a layer of material formed on a surface of a disc in a disc filter, the method comprising:
   rotating the disc;
   transporting the shower through a series of radial cleaning positions relative to the surface of the disc;
   directing wash liquid from the shower at the disc to clean the disc; and
   controlling the speed of transport of the shower across the surface of the disc such that the time spent by the shower at each radial cleaning position is generally proportional to the radial distance of the cleaning position from the center of the disc, whereby the surface of the disc is cleaned generally uniformly over the extent of the surface.

14. A disc filter for receiving an input slurry and separating a liquid from a solid in the input slurry, the disc filter comprising:
   a disc mounted for rotation;
   a cleaning system comprising:
      a shower having at least one nozzle directing liquid at the disc;
      a drive mechanism transporting the shower through a series of radial cleaning positions relative to a surface of the disc; and
      a controller controlling the drive mechanism to vary the speed of transport of the shower across the surface of the disc such that time spent by the shower cleaning the disc at each radial cleaning position is generally proportional to the radial distance of the cleaning position from the center of the disc,
   whereby the surface of the disc is cleaned generally uniformly over the extent of the surface.

* * * * *

UNITED STATES PATENT AND TRADEMARK OFFICE
CERTIFICATE OF CORRECTION

PATENT NO. : 6,063,294 Page 1 of 1
DATED : May 16, 2000
INVENTOR(S) : Johan Martensson et al.

It is certified that error appears in the above-identified patent and that said Letters Patent is hereby corrected as shown below:

Title page,
Item [75], Inventors, after "Bal K." delete "Seth" and insert therefor -- Sethi --
Item [56], References Cited, U.S. PATENT DOCUMENTS, after "2,576,288 11/1951", delete "Bench" and insert therefor -- A.O. Fink et al --; and after "2,565,388", insert -- 2,565,275 11/1951 Bench --

Column 1,
Line 7, after "No.", delete "08/729,922" and insert therefor -- 08/729,923 --

Column 2,
Line 31, after "comprises", delete "a" and insert therefor -- an --

Column 3,
Line 21, after "is", insert -- a --

Column 4,
Lines 56-57, before "preferably", delete "Referring to FIG.11, spray nozzles 110 and 111 are illustrated."

Column 5,
Line 12, after "yet", delete "an"

Signed and Sealed this

Twenty-seventh Day of January, 2004

JON W. DUDAS
*Acting Director of the United States Patent and Trademark Office*